(12) United States Patent
Sato et al.

(10) Patent No.: US 9,478,243 B2
(45) Date of Patent: Oct. 25, 2016

(54) MAGNETIC RECORDING MEDIUM FOR HEAT-ASSISTED RECORDING SYSTEM AND METHOD FOR MANUFACTURING SAME

(71) Applicant: FUJI ELECTRIC CO., LTD., Kawasaki-shi (JP)

(72) Inventors: Narumi Sato, Matsumoto (JP); Akiyasu Kumagai, Matsumoto (JP); Tomonori Katano, Matsumoto (JP); Katsumi Taniguchi, Matsumoto (JP)

(73) Assignee: FUJI ELECTRIC CO., LTD., Kawasaki-Shi (JP)

(*) Notice: Subject to any disclaimer, the term of this patent is extended or adjusted under 35 U.S.C. 154(b) by 0 days.

(21) Appl. No.: 14/680,007

(22) Filed: Apr. 6, 2015

(65) Prior Publication Data
US 2015/0213825 A1    Jul. 30, 2015

Related U.S. Application Data

(63) Continuation of application No. PCT/JP2013/006087, filed on Oct. 11, 2013.

(30) Foreign Application Priority Data

Oct. 15, 2012  (JP) .................................. 2012-227734

(51) Int. Cl.
| | | |
|---|---|---|
| G11B 5/66 | (2006.01) | |
| G11B 5/72 | (2006.01) | |
| G11B 5/84 | (2006.01) | |

(52) U.S. Cl.
CPC ............. *G11B 5/72* (2013.01); *G11B 5/8408* (2013.01)

(58) Field of Classification Search
None
See application file for complete search history.

(56) References Cited

U.S. PATENT DOCUMENTS

| | | | |
|---|---|---|---|
| 5,425,988 A * | 6/1995 | Ogawa .................. | B05D 1/185 360/122 |
| 2008/0113224 A1 | 5/2008 | Ono et al. | |
| 2009/0316289 A1 | 12/2009 | Okura | |
| 2010/0129686 A1 | 5/2010 | Furuta et al. | |
| 2015/0010781 A1* | 1/2015 | Katano .................. | G11B 5/725 428/833.3 |

FOREIGN PATENT DOCUMENTS

| | | |
|---|---|---|
| JP | 1998 H10-049853 | 2/1998 |
| JP | 2006-277779 | 10/2006 |
| JP | 2006-351135 | 12/2006 |
| JP | 2008-123646 | 5/2008 |
| JP | 2010-003359 | 1/2010 |
| JP | 2010-153012 | 7/2010 |

* cited by examiner

*Primary Examiner* — Holly Rickman
(74) *Attorney, Agent, or Firm* — Rabin & Berdo, P.C.

(57) ABSTRACT

The magnetic recording medium for a heat-assisted recording system has a magnetic recording layer on a non-magnetic substrate and a protective layer on top of the magnetic recording layer. The protective layer includes a first lower protective layer on top of the magnetic recording layer, a first upper protective layer on the first lower protective layer, and a second protective layer on the first upper protective layer. The first lower protective layer is composed mainly of an element selected from the group consisting of Si, Al and Cu, and the first upper protective layer is a layer configured by an oxide of the material of the first lower protective layer.

4 Claims, 3 Drawing Sheets

MAGNETIC RECORDING MEDIUM FOR HEAT-ASSISTED RECORDING SYSTEM AND METHOD FOR MANUFACTURING SAME

This application is a continuation under 35 U.S.C. 120 of International Application PCT/JP2013/006087 having the International Filing Date of Oct. 11, 2013, and having the benefit of the earlier filing date of Japanese Application No. 2012-227734, filed Oct. 15, 2012. All of the identified applications are fully incorporated herein by reference.

TECHNICAL FIELD

The present invention relates to a magnetic recording medium for a heat-assisted recording system and a method for manufacturing the same.

BACKGROUND ART

The storage capacity of hard disk drives has been steadily increasing, as well as the recording density of magnetic recording media mounted therein. In response to these increases, the flying height of a magnetic recording head is becoming smaller over the years, raising the need to reduce the distance between the head and the magnetic recording layer (magnetic spacing) more and more. As one of the methods for reducing the magnetic space, there is a method for thinning a protective layer formed on the magnetic recording layer.

Because the protective layer literally serves to protect the magnetic recording layer, the protective layer needs to have a high corrosion resistance in order to prevent the magnetic recording layer, made of metal or the like, from becoming corroded by reaction with atmospheric moisture or corrosive gas. Furthermore, the head moves on the magnetic recording medium at relatively high speed and flies thereon keeping small magnetic spacing therebetween. The protective layer is also required to be durable to the flying travel motion of the head in order to protect the magnetic recording layer from damage even in a case where the head comes into contact with the magnetic recording medium due to some problem. Currently the protective layers are made of DLC (diamond-like carbon) and as thin as 3.0 nm.

A heat-assisted recording system has been designed as a new recording system for coping with higher recording density, the advent of which is in 1 to 2 years. The heat-assisted recording system is a technique that enables magnetic recording in higher recording density by radiating a laser beam or the like onto the surface of the magnetic recording medium, heating the magnetic recording medium with light absorbed therefrom, reducing the coercivity of the magnetic recording layer using the resultant increased temperature, and assisting the head in writing signals. In this heat-assisted recording system, the protective layer and lubricating layer are expected to be heated up to approximately 300° C. or higher due to the heat resulting from the increased temperature of the magnetic recording layer. Therefore, the protective layer and the lubricating layer that are employed in such a heat-assisted recording system are required to be corrosion-resistant and durable to the heat from the laser radiation (referred to as "heating with laser beam"), as described above.

Unfortunately, employing such a heat-assisted recording system in a conventional magnetic recording medium with a DLC protective layer to write signals, leads to quality degradation in the protective layer and lubricating layer due to the heat from the laser beam. This consequently causes an increase in the number of errors due to deterioration of the corrosion resistance of the protective layer and the lubricating layer, a shortening of the life of the magnetic recording medium due to degradation of the durability of the protective layer and the lubricating layer, and an increase in the risk of damage to the magnetic recording medium. As a measure to prevent these phenomena, Patent Document 1 discloses a method for forming a protective layer on a heat-insulating layer provided on a magnetic recording layer. Patent Document 1 describes that such materials of low thermal conductivity as $SiO_2$, $TiO_2$, and $ZrO_2$ are preferred as the heat-insulating layer and that the heat-insulating layer is made by reactive sputtering method using O2 gas for forming a film with a target of each material.

However, after executing this method, the inventors of the present application discovered that the $O_2$ gas for forming the heat-insulating layer causes oxidation and hence deterioration of the magnetic recording layer and that the method is therefore not for practical use.

Patent Document 1: Japanese Patent Application Publication No. 2010-153012

SUMMARY

One of the objects of the present invention is to provide a corrosion-resistant, durable magnetic recording medium for a heat-assisted recording system that employs a thermal-resistant protective layer capable of tolerating the heat-assisted recording system while preventing deterioration of a magnetic recording layer.

Examples of the means for achieving the object of the present invention are described below.

One of the examples is a magnetic recording medium for a heat-assisted recording system, which has: a magnetic recording layer on a non-magnetic substrate; and a protective layer on top of the magnetic recording layer, wherein the protective layer includes a first lower protective layer on top of the magnetic recording layer, a first upper protective layer on the first lower protective layer, and a second protective layer on the first upper protective layer, the first lower protective layer is composed mainly of an element selected from the group consisting of Si, Al and Cu, and the first upper protective layer is a layer configured by an oxide of the material of the first lower protective layer.

It is preferred that the first lower protective layer be made of non-magnetic metal having a thermal conductivity of 100 W/(m·k) or higher, and that the first upper protective layer have a conductivity of 50 W/(m·k) or lower.

Another example is a method for manufacturing a magnetic recording medium for a heat-assisted recording system that has a magnetic recording layer on a non-magnetic substrate and a protective layer on top of the magnetic recording layer, the method sequentially executing: a step of forming a first protective layer on top of the magnetic recording layer; a step of forming a second protective layer on top of the first protective layer; and an oxidation treatment step, wherein the second protective layer has a film thickness of 0.3 nm or more and 2 nm or less, and the first protective layer is composed mainly of an element selected from the group consisting of Si, Al and Cu.

Yet another example is a method for manufacturing a magnetic recording medium for a heat-assisted recording system that has a magnetic recording layer on a non-magnetic substrate and a protective layer on top of the magnetic recording layer, the method sequentially executing: a step of forming a first protective layer on top of the magnetic recording layer; an oxidation treatment step; and a step of forming a second protective layer on top of the first protective layer, wherein the second protective layer has a film thickness of 0.3 nm or more and 5 nm or less, and the first protective layer is composed mainly of an element selected from the group consisting of Si, Al and Cu.

The present invention can provide a magnetic recording medium for a heat-assisted recording system that has the same level of corrosion resistance and durability as the conventional magnetic recording media and employs a thermal-resistant protective layer capable of tolerating the heat-assisted recording system while preventing deterioration of a magnetic recording layer.

DETAILED DESCRIPTION

An embodiment of the present invention is now described hereinafter with reference to the drawings.

Figure 1:
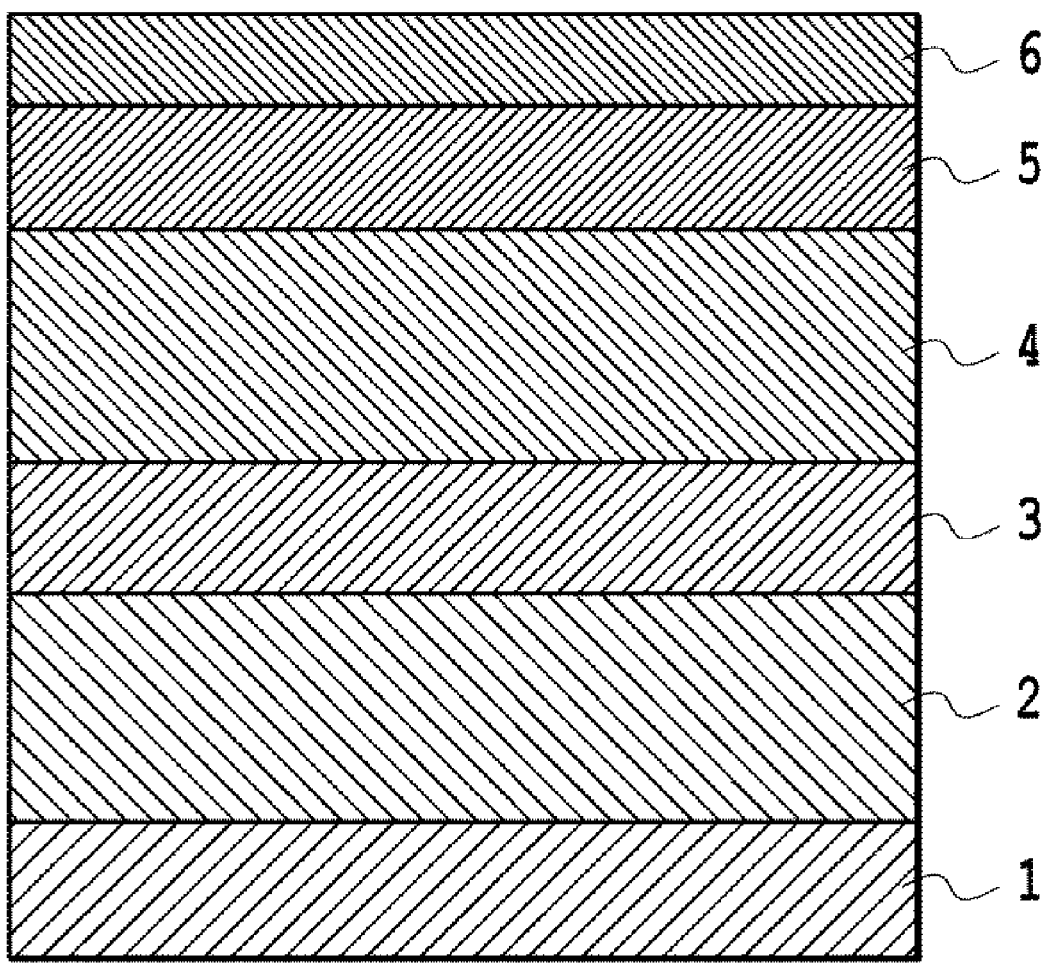
FIG. 1 is a schematic cross-sectional diagram showing a configuration of the middle stage of a process for manufacturing a magnetic recording medium of the present invention.
Figure 2:
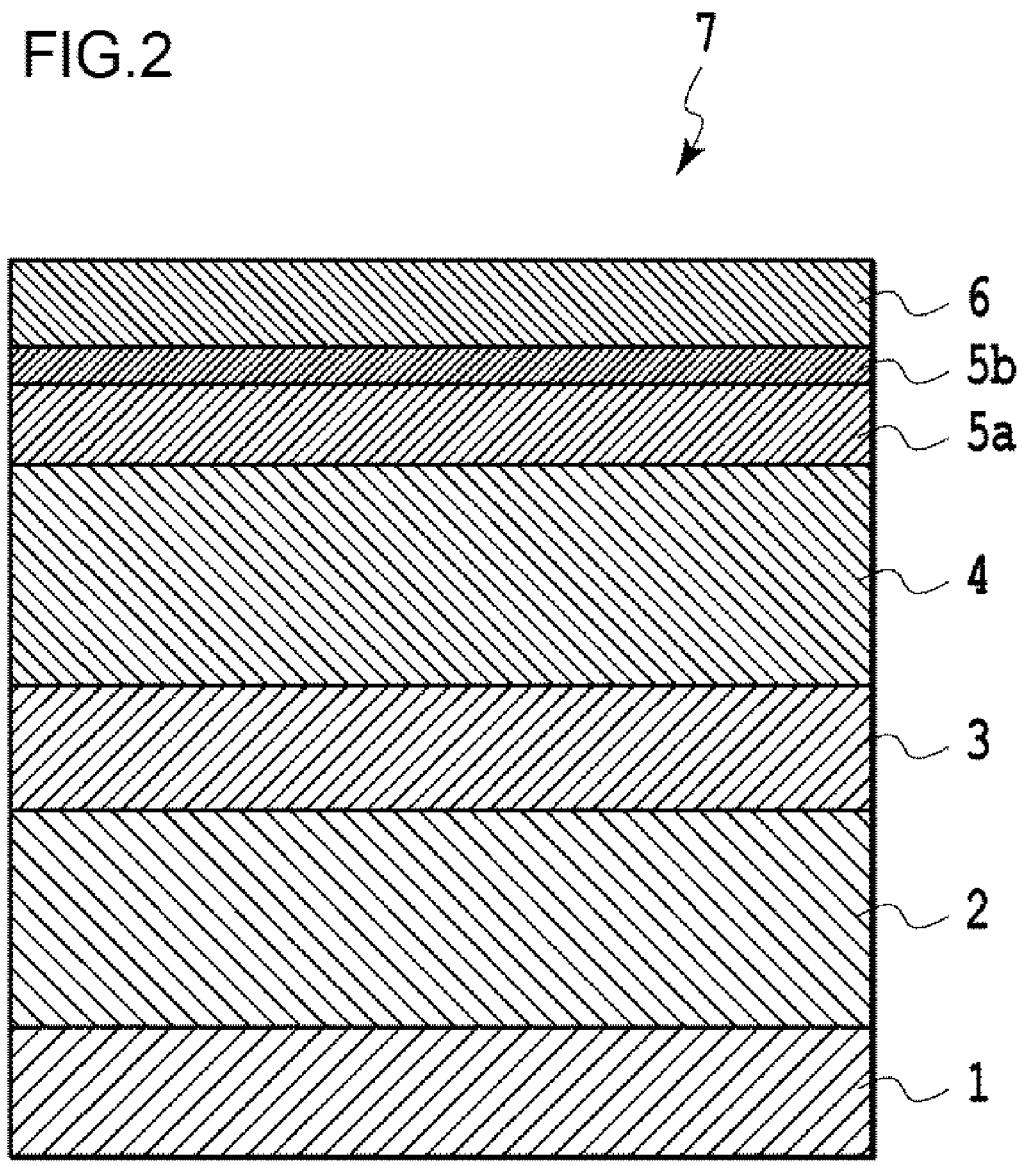
FIG. 2 is a schematic cross-sectional diagram showing a configuration of the magnetic recording medium of the present invention.
Figure 3:
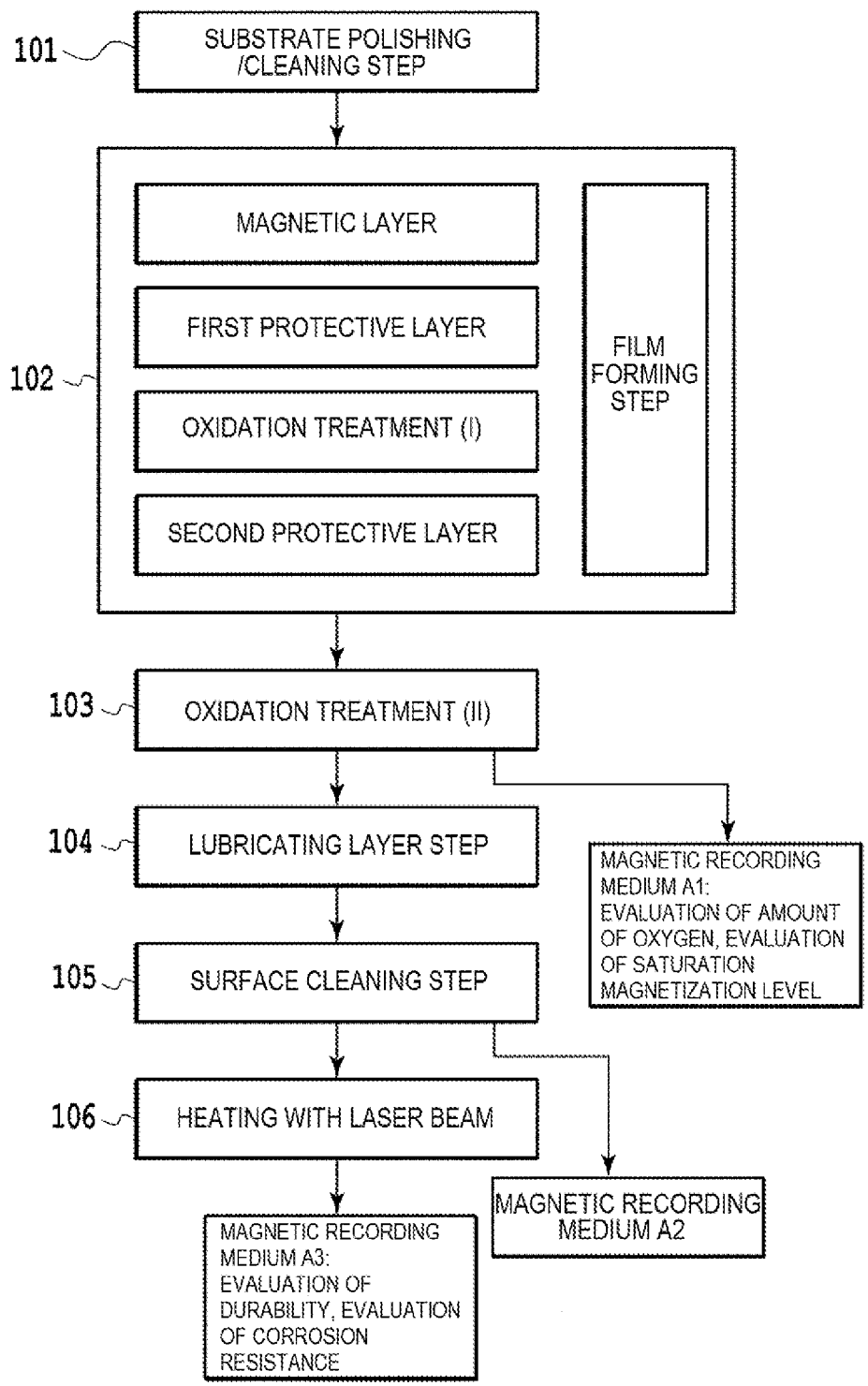
FIG. 3 shows an example of the steps of manufacturing the magnetic recording medium of the present invention.

FIG. 1 is a schematic cross-sectional diagram showing the middle stage of a process for manufacturing a magnetic recording medium of the present invention, FIG. 2 a schematic cross-sectional diagram of the manufactured magnetic recording medium, and FIG. 3 a diagram showing an example of the steps of manufacturing the magnetic recording medium that are used in the present invention.

First of all, in a substrate polishing/cleaning step 101, a toroidal disc substrate having glass or aluminum as a base material is polished until smooth enough to allow a head to fly thereon. Thereafter, the abrasive and polishing sludge are washed away meticulously. Specifically, for example, after a substrate having glass as a base material is polished in the substrate polishing/cleaning step 101 until the surface roughness Ra of approximately 0.1 nm is obtained, the abrasive and polishing sludge are removed thoroughly by ultrasonic cleaning and scrub cleaning. As a result, a non-magnetic substrate 1 is obtained.

In the subsequent film forming step 102, a magnetic recording layer 4 and a protective layer are formed sequentially on the non-magnetic substrate 1 by a sputtering method or the like in a film forming apparatus kept in vacuum. In the present invention, a soft magnetic underlayer 2 and an underlayer 3 may be formed as optional layers between the non-magnetic substrate 1 and the magnetic recording layer 4. The soft magnetic underlayer 2 serves to focus a magnetic flux that is generated by a single magnetic pole head used for recording on the magnetic recording layer 4, and a ferrite-based or CoFe-based soft magnetic material is used as the soft magnetic underlayer 2. Also, the soft magnetic underlayer 2 preferably has a laminate structure configured by a soft magnetic layer disposed near the non-magnetic substrate, an exchange-coupling control layer, and a soft magnetic layer disposed near the magnetic recording layer. However, the structure of the soft magnetic underlayer 2 is not limited thereto and may have a single-layer structure.

The underlayer 3 is a layer for controlling the crystal grain diameter and crystalline orientation in the magnetic recording layer 4. The material of the underlayer 3, therefore, is selected properly in accordance with the material of the magnetic recording layer. For example, if the material of the magnetic recording layer 4 disposed immediately on the underlayer 3 is mainly composed of Co having a hexagonal close-packed (hcp) structure, the material of the underlayer 3 is preferably selected from among the materials that have the same hexagonal closest-packing structure or a face-centered cubic (fcc) structure. Specifically, Ru, Re, Rh, Pt, Pd, Ir, Ni, Co, or alloy thereof can be used as the material of the underlayer 3.

Examples of the material of the magnetic recording layer 4 include CoCr alloy and CoPt alloy, and the thickness thereof is approximately 5 to 50 nm. The magnetic grains of the magnetic recording layer need to be magnetically separated from each other for the purpose of reducing noise of a magnetic recording signal, and the magnetic recording layer 4 has a granular structure in which an oxide of $SiO_2$ or the like is added to the magnetic recording layer made of the alloy. The magnetic recording layer 4 may be made of ordered alloy such as FePt or have a laminate structure.

After the magnetic recording layer 4 is formed, then successively the protective layer is formed in a film forming apparatus kept in vacuum. First, a first protective layer 5 is formed. Specifically, for example, Ar gas, which is inert gas, is poured into a film formation chamber with a Si target at a flow rate of 20 sccm, to form a Si film by a DC sputtering technique at a DC output of 150 W. The film thickness of the Si film is controlled by adjusting the film forming time. As a result of keen examination, it is preferred that the material of the first protective layer 5 be composed mainly of an element selected from the group consisting of Si, Al and Cu. When described as "composed mainly of", it means that the other elements may be contained as impurities.

Formation of a first upper protective layer 5b is described next. There are two methods for forming the first upper protective layer 5b. In one method, the formed first protective layer 5 is subjected to an oxidation treatment to form a first lower protective layer 5a and the first upper protective layer 5b configured by an oxide of the material of the first lower protective layer 5a, and subsequently a second protective layer 6 is formed. This oxidation treatment is referred to as "oxidation treatment (I)." In the other method, the second protective layer 6 is formed after the first protective layer 5 is formed, and subsequently an oxidation treatment is executed to form the first lower protective layer 5a and the first upper protective layer 5b configured by an oxide of the material of the first lower protective layer 5a. This oxidation treatment is referred to as "oxidation treatment (II)."

In the method using the oxidation treatment (I), after the first protective layer 5 is formed, this first protective layer 5 can be subjected to the oxidation treatment (I) by an oxygen plasma process, an ultraviolet irradiation process under the oxygen atmosphere, a heating process under the oxygen atmosphere, or the like, to form the first upper protective layer 5b. Specifically, it is preferred that ultraviolet rays be radiated using a low-pressure mercury lamp or an excimer lamp under the oxygen environment. When the second protective layer 6 has a thickness of 2 nm or more, it is preferred that the oxidation treatment be executed after the first protective layer 5 is formed.

In terms of preventing adhesion of foreign matters, it is preferred that the oxidation treatment (I) be executed in the same apparatus as the one in which the first protective layer 5 is formed. The oxidation treatment may also be executed outside the apparatus.

Next, the second protective layer 6 is formed by a plasma CVD (chemical vapor deposition) method or the like. Specifically, for example, the second protective layer 6 made of DLC is formed by a thermal filament plasma CVD method. The source gas for this plasma CVD can be $C_2H_4$ which can be poured at a gas flow rate of 30 sccm, and the bias voltage between the filament and the substrate can be 100 V. However, the conditions for the plasma CVD method are not limited thereto. The thickness of the second protective layer 6 is preferably 0.3 nm or more and 5 nm or less, or more preferably 0.3 nm or more and 2.0 nm or less in view of reducing the magnetic space and ensuring the protective functions such as corrosive resistance. The film thickness can be controlled by adjusting the film forming time.

The second protective layer 6 may be made not only of DLC but also of glassy carbon, and hydrogen, nitrogen or the like may be added thereto. The method for forming the second protective layer 6 is also not limited to the CVD method, and a sputtering method may be used as well.

When the film thickness of the second protective layer 6 is 0.3 nm or more and 2.0 nm or less, the oxidation treatment (I) is not executed, but the oxidation treatment (II) can be executed after the second protective layer 6 is formed, to form the first upper protective layer 5b which is an oxide layer of the first protective layer 5. In the oxidation treatment (II), it is preferred that the magnetic recording medium be left in the atmospheric environment with a temperature of 10° C. to 85° C. and a humidity of 10% RH to 85% RH for 10 hours or more. This allows the oxygen molecules to penetrate the second protective layer 6 and oxidize a part of the first protective layer 5 on the second protective layer 6 side, thereby forming the first upper protective layer 5b. It is more preferred that the magnetic recording medium be left in the atmospheric environment with a temperature of 40° C. to 60° C. and a humidity of 10% RH to 40% RH for 10 to 20 hours. A more even and favorable oxide film can be formed within these ranges of temperature and humidity, preventing such problems as an increase in the surface roughness and frequent fluctuation in the saturation magnetization level. Additionally, it is preferred that the environment have a cleanliness of class 1000 or lower in order to prevent the medium from being contaminated by particles. The cleanliness of class 1000 means that 1000 particles with a diameter of 0.5 μm or more are present within a cubic feet. In the present embodiment, although the part of the first protective layer 5 on the second protective layer 6 side becomes oxidized by placing the magnetic recording medium 7 in the atmospheric environment as described above, the embodiment is not limited to the configuration in which the magnetic recording medium is placed in the atmospheric environment, as long as the same effects can be achieved. As long as the environment has oxygen, it is possible to achieve the same effects as those realized by the processes performed under the atmospheric environment, by appropriately adjusting the oxygen concentration and the processing time. When the film thickness of the second protective layer 6 is 2 nm or less, it is preferable cost-wise to execute the oxidation treatment (II) to form the first upper protective layer 5b. In addition, executing the oxidation treatment (II) before forming the lubricating layer can not only make the time required for the oxidation treatment (II) shorter than executing the oxidation treatment (II) after forming the lubricating layer, but also form the oxide layer uniformly.

Subsequently, in a lubricating layer step 104, a liquid lubricant may be applied onto the second protective layer 6 to form the lubricating layer (not shown). Perfluoropolyether (PFPE), for example, is used as the liquid lubricant, which is applied by spin coating or dipping. In order to measure the thickness of the lubricating layer, first, the surface of the recording medium without the lubricating layer is measured in advance by a Fourier transform infrared spectroscopy (FT-IR). Then, the surface of the recording medium is measured again after the lubricating layer is formed therein. The thickness of the lubricating layer can be obtained from the difference in intensity these recording media. Specifically, for example, the lubricating layer is formed using a lubricant Z-Tetraol (manufactured by Solvay Solexis) by means of a dipping method. In consideration of the film properties and the like of the protective layer, it is preferred that the lubricating layer be thick enough to function as a lubricating layer, the thickness being preferably 0.3 nm to 1.5 nm.

The magnetic recording medium that is obtained through the foregoing steps is subjected to a surface cleaning step 105 for removing projections/stain on the surface which could impede the flight of the head. Specifically, for example, the entire surface on the magnetic recording medium is scanned with varnished tape having abrasive grains of alumina or the like with a grain size #6000, thereby removing the projections/stain on the magnetic recording medium.

A step of manufacturing the resultant magnetic recording medium is shown in FIG. 3. Here, the magnetic recording medium obtained before the lubricating layer is formed is referred to as "magnetic recording medium A1." When the oxidation treatment (I) is executed, the oxidation treatment (II) might not be executed, in which case the A1 is the magnetic recording medium obtained after the second protective film is formed. When the oxidation treatment (II) is executed, however, the magnetic recording medium A1 is obtained after the execution of the oxidation treatment (II). Also, the magnetic recording medium in which the lubricating layer is formed and on which the surface cleaning is performed is referred to as "magnetic recording medium A2." The magnetic recording medium which is irradiated and heated with a laser beam is referred to as "magnetic recording medium A3."

Next is described a method for using these magnetic recording media to evaluate the amount of oxygen in the first upper protective layer 5b and the saturation magnetization level, corrosion resistance, and durability of the magnetic recording medium 7.

First, the amount of oxygen in the first upper protective layer 5b is obtained by measuring the element intensity distribution in the depth direction of the magnetic recording medium A1 (depth profile) by means of an X-ray photoelectron spectroscopic analysis (XPS). For example, if the first lower protective layer 5a is made of Si, the first upper protective layer 5b $SiO_2$, and the second protective layer 6 DLC, the point where the depth profiles of the C1s spectrum and the Si1s spectrum intersect with each other is considered as a boundary between the second protective layer 6 and the first upper protective layer 5b, and the intensity of the O1s spectrum at this moment is obtained. The amounts of oxygen were evaluated based on the O1s spectrum intensities.

The saturation magnetization level is measured in order to evaluate the deterioration of the magnetic recording layer resulting from the formation of the first protective layer 5 and the second protective layer 6. The saturation magnetization level Ms of the magnetic recording medium is obtained by obtaining a hysteresis loop of the magnetic recording medium A1 using a polar Kerr effect measurement apparatus. The magnetic recording medium A1 passes the evaluation test when the value of the saturation magnetization level Ms is above or below 1% with respect to a reference. The reference indicates a magnetic recording medium that is subjected to the same manufacturing process as the magnetic recording medium A1 other than the fact that the first protective layer 5 and the second protective layer 6 are not formed in the reference.

Next, the deterioration of the corrosion resistance and durability of the protective layer and lubricating layer was measured when the magnetic recording medium is actually heated with a laser beam. First, the laser beam is radiated onto the magnetic recording medium to heat the magnetic recording medium. Specifically, while rotating the magnetic recording medium A2 at constant speed, the laser beam is radiated onto its surface to heat the magnetic recording layer thereof. More specifically, for example, while rotating the magnetic recording medium A2 having an outer diameter of 65 mm and an inner diameter of 20 mm at 4200 rpm, a laser beam with a wavelength of 650 nm and a spot size of 0.9 µm is radiated onto the surface of the magnetic recording medium A2 with a power of 30 mW. In view of the life of the hard disk drive, the laser beam is radiated up to 5 msec which is a radiation time based on the assumption of 1 million times of writing per section. This radiation is executed at 25 µm interval within a range of radius of 15 mm to 30 mm. Note that this evaluation may be performed, not only by heating the magnetic recording medium with a laser beam but also by heating with a microwave.

Next, the corrosion resistance is evaluated by dropping acid onto an arbitrary section with a radius of 15 mm to 30 mm and measuring the amount of the material of the magnetic recording layer that melts into the acid through the first lower protective layer 5a, the first upper protective layer 5b, the second protective layer 6, and the lubricating layer. When the magnetic recording layer 4 is made of CoCr alloy, improvement and deterioration of corrosion resistance of the protective layer and the lubricating layer can be determined by evaluating the amount of Co melted into the acid. With the other materials for the magnetic recording layer as well, improvement or deterioration of corrosion resistance of the protective layer and the lubricating layer can be determined by evaluating the melted amount of the primary element contained in the material of the magnetic recording layer. The evaluation can be done in the following order: a certain amount of acid is dropped onto the horizontally placed magnetic recording medium A3, which is left for a certain period of time, and then the entire acid solution is recovered. The acid is nitric acid with volume concentration of 3% and can be dropped in an amount of 0.8 ml and left on the magnetic recording medium for one hour. The amount of Co contained in the solution is measured by ICP-MS (Inductively Coupled Plasma Mass Spectrometry). The Co elution amount per unit area is obtained by dividing the measured value by the area on the surface of the magnetic recording medium with which the dropped solution comes into contact.

In terms of the criterion for determining the level of corrosion resistance based on the results, if a Co elution amount per unit area is 1 ng/cm$^2$ or less, the magnetic recording medium is considered acceptable.

The magnetic recording medium A3 is used to evaluate the durability. While rotating the magnetic recording medium A3 at constant speed, a ball is pressed against the surface thereof at a certain amount of pressure to measure a kinetic friction coefficient. Damage on the surface caused due to wear is detected based on the changes in the kinetic friction coefficient, to evaluate the number of sliding motions leading to the surface damage. Specifically, while the magnetic recording medium A3 is rotated at a peripheral speed of 30 cm/sec, a ball 3 mm in diameter made of Al$_2$O$_3$.TiC is pressed against the surface of the magnetic recording medium A3 at a load of 25 g. Based on the results, the magnetic recording medium A3 is considered acceptable if the number of sliding motions is 200 times or more.

As a result of keen examination, it was found out that Si, Al, and Cu is preferred as the material for the first protective layer 5. In the magnetic recording medium in which the first protective layer 5 made of Ti, Zr or Mg is formed and oxide films are formed by the oxidation treatment (I) and the oxidation treatment (II) respectively, the film properties of the protective layer and the lubricating layer had deteriorated due to the heat of the laser beam, resulting in degrading the corrosion resistance and the durability of the magnetic recording medium. On the other hand, the magnetic recording medium in which a Si, Al or Cu film is formed and the oxide films are formed by the oxidation treatments was able to ensure its corrosion resistance and durability in spite of the heat of the laser beam.

As shown in Table 1, Si, Al, Cu, and Mg have higher thermal conductivity than Ti and Zr. In the magnetic recording medium in which a Si, Al or Cu film is formed and the oxide films are formed by the oxidation treatments, the first lower protective layer 5a, which has high thermal conductivity, serves as a heat diffusion layer on the magnetic recording layer to efficiently diffuse in the plane the heat generated by the magnetic recording layer heated with the laser beam. Furthermore, the first upper protective layer 5b (metal oxide layer), which has low thermal conductivity, serves as a heat-insulating layer to prevent transmission of the heat to the second protective layer 6. The presence of the heat diffusion layer and heat-insulating layer between the magnetic recording layer and the second protective layer 6 can prevent deterioration of the film properties of the second protective layer 6 and the lubricating layer. When a material that has low thermal conductivity by itself such as Ti or Zr was used in the first lower protective layer 5a, the first lower protective layer 5a did not serve as a heat diffusion layer for diffusing the heat in the plane, and the heat is considered to have caused deterioration in the film properties of the second protective layer 6 and lubricating layer disposed immediately on the magnetic recording layer by being transmitted thereto. Furthermore, when a material that has high thermal conductivity by itself such as Mg was used in the first lower protective layer 5a, the first lower protective layer 5a served as a heat diffusion layer to diffuse the heat in the plane, but the high level of conductivity of the first upper protective layer 5b (metal oxide layer) is considered to have transmitted the heat to the second protective layer 6 and lubricating layer and thus lead to deterioration of the film properties thereof.

In other words, it is preferred that (1) a heat diffusion layer (the first lower protective layer) with high thermal conductivity be provided on the magnetic recording layer, and that (2) a heat-insulating layer (the first upper protective layer 5b) with low thermal conductivity be provided on the first lower protective layer 5a. The thermal conductivities of the materials are shown in Table 1.

TABLE 1

| Material | Thermal conductivity of single material (W/(m · k)) | Thermal conductivity of oxide (W/(m · k)) |
|---|---|---|
| Cu | 400 | 3.4 |
| Al | 235 | 21 |
| Si | 150 | 1.4 |
| Ti | 22 | 8.4 |
| Zr | 23 | 4.0 |
| Mg | 156 | 60 |

EXAMPLES

Examples of the present invention are now described below. These examples are merely typical examples for favorably illustrating the perpendicular magnetic recording medium of the present invention, and the present invention is not limited thereto.

In order to obtain the reference value of the saturation magnetization level Ms, a reference magnetic recording medium was prepared and the saturation magnetization level Ms thereof was measured beforehand. This reference magnetic recording medium was formed through the same manufacturing process under the same manufacturing conditions as Example 1, except that the first protective layer 5, the second protective layer 6, and the lubricating layer were not formed therein. The reference value was 783 emu/cm$^3$.

Example 1

In Example 1, a magnetic recording medium was prepared by forming, sequentially on a non-magnetic substrate 1, a Co-based soft magnetic underlayer 2, an underlayer 3 made of Ru, a CoCrPt—SiO$_2$ granular magnetic recording layer 4, a first lower protective layer 5*a* made of Si, a first upper protective layer 5*b* made of SiO$_2$, a second protective layer 6 made of DLC, and a lubricating layer (not shown), as shown in FIG. 2.

The examples are described hereinbelow with reference to FIGS. 1 and 2. A disk-shaped chemically strengthened glass substrate (N-10, manufactured by HOYA Corporation) with a smooth surface was used as the non-magnetic substrate 1. First, the non-magnetic substrate 1 was washed and then introduced into a film forming apparatus. The soft magnetic underlayer 2 to the second protective layer 6 were all formed inside the in-line type film forming apparatus without being exposed to the atmosphere.

A layer 20 nm in film thickness made of CoZrNb was formed as the soft magnetic underlayer 2 by a DC magnetron sputtering technique in an Ar gas atmosphere at a vacuum degree of 1.5 Pa. Subsequently, a layer 20 nm in film thickness made of Ru was formed as the underlayer 3 by a DC magnetron sputtering technique in an Ar gas atmosphere at a vacuum degree of 1.5 Pa.

Next, a layer 15 nm in film thickness having a composition of 91 vol % (Co75Cr15Pt10)—9 vol % (SiO$_2$) was formed as the magnetic recording layer 4 by a DC magnetron sputtering technique in an Ar gas atmosphere at a vacuum degree of 1.0 Pa.

Thereafter, a Si film was formed into 1.0 nm as the first protective layer 5. Argon gas was poured into a film formation chamber provided with a Si target at a flow rate of 20 sccm, to form the Si film by a DC sputtering technique at a DC output of 150 W.

A DLC film was formed into a film thickness of 2.0 nm (Example 1-1), 1.5 nm (Example 1-2), 1.0 nm (Example 1-3), 0.5 nm (Example 1-4), or 0.3 nm (Example 1-5) as the second protective layer 6 on the Si film. The second protective layer 6 was prepared using a thermal filament plasma CVD method. The source gas for the plasma CVD was C$_2$H$_4$ which poured at a gas flow rate of 30 sccm, and the bias voltage between the filament and the substrate was 100 V.

Thereafter, the oxidation treatment (II) was executed in the atmospheric environment with a temperature of 40° C. and a humidity of 30% RH for 15 hours to form the first upper protective layer 5*b* and then the lubricating layer into 0.9 nm, to prepare the magnetic recording medium 7 through the surface cleaning step 105. Then, the magnetic recording medium 7 was heated with a laser beam. The results of evaluating the amount of oxygen, saturation magnetization level, corrosion resistance, and durability of each prepared magnetic recording medium are shown in Table 2.

Example 2

A magnetic recording medium of Example 2 was prepared and evaluated in the same manner as Example 1, except that Al was employed as the material for the first protective layer 5 and the second protective layer 6 was formed into film thicknesses of 2.0 nm, 1.5 nm, 1.0 nm, and 0.5 nm. The results are shown in Table 2.

Example 3

A magnetic recording medium of Example 3 was prepared and evaluated in the same manner as Example 1, except that Cu was employed as the material for the first protective layer 5 and the second protective layer 6 was formed into film thicknesses of 2.0 nm, 1.5 nm, 1.0 nm, and 0.5 nm. The results are shown in Table 2.

Example 4

A magnetic recording medium of Example 4 was prepared and evaluated in the same manner as Example 1, except that the oxidation treatment based on an ultraviolet irradiation process was executed to form the second protective layer 6 into 2 nm, 3 nm, 4 nm, and 5 nm after the first protective layer 5 was formed, and that the oxidation treatment was not executed after the formation of the second protective layer 6. The ultraviolet irradiation process was executed in the film forming apparatus in which the first protective layer 5 was formed, wherein a mixed gas in which nitrogen and oxygen are mixed at a volume ratio of 1:1 was introduced into the film forming apparatus, with the pressure being adjusted to normal pressure, and the first protective layer 5 was irradiated with a low-pressure mercury lamp with a dominant wavelength of 185 nm at 40 W for 15 seconds. The results are shown in Table 2.

Comparative Example 1

A magnetic recording medium of Comparative Example 1 was prepared and evaluated in the same manner as Example 1, except that the film thickness of the DLC film formed as the second protective layer 6 was 0 nm. The results are shown in Table 3.

Comparative Example 2

A magnetic recording medium of Comparative Example 2 was prepared and evaluated in the same manner as Example 1, except that Zr was employed as the material for the first protective layer 5 and the second protective layer 6 was formed into film thicknesses of 2.0 nm, 1.5 nm, 1.0 nm, and 0.5 nm. The results are shown in Table 3.

Comparative Example 3

The Si film was formed into a thickness of 1.0 nm as the first protective layer 5, and then the second protective layer 6 was formed thereon into a thickness of 5.0 nm (Comparative Example 3-1), 4.0 nm (Comparative Example 3-2), 3.0 nm (Comparative Example 3-3), or 2.5 nm (Comparative Example 3-4). Other than these steps, this magnetic recording medium was prepared and evaluated in the same manner as Example 1. The results are shown in Table 3.

Comparative Example 4

When forming the first protective layer 5, $O_2$ gas was used as a film forming gas to form a Si film into a thickness of 1.0 nm. The second protective layer 6 was formed thereon into a thickness of 2.0 nm. Other than these steps, this magnetic recording medium was prepared and evaluated in the same manner as Example 1. The results are shown in Table 3.

Comparative Example 5

A magnetic recording medium of Comparative Example 5 was prepared and evaluated in the same manner as Example 1, except that Mg was employed as the material for the first protective layer 5 and the second protective layer 6 was formed into film thicknesses of 2.0 nm, 1.5 nm, 1.0 nm, and 0.5 nm. The results are shown in Table 3.

Next are described reference examples in which heating with a laser beam is not performed.

A Si film was formed into 1.0 nm as the first protective layer 5, and the second protective layer 6 was formed thereon into a thickness of 1.0 nm (Reference Example 1), 3.0 nm (Reference Example 2), or 5.0 nm (Reference Example 3). Furthermore, a Zr film was formed into 1.0 nm as the first protective layer 5, and the second protective layer 6 was formed thereon into a thickness of 1.0 nm (Reference Example 4). Moreover, a Mg film was formed into 1.0 nm as the first protective layer 5, and the second protective layer 6 was formed thereon into a thickness of 1.0 nm (Reference Example 5).

Thereafter, the oxidation treatment described in Example 1 was executed to form a lubricating layer into 0.9 nm, preparing a magnetic recording medium through the surface cleaning step 105. Subsequently, the corrosion resistance and durability of this magnetic recording medium were evaluated without heating the magnetic recording medium with a laser beam. The results are shown in Table 3.

According to the results of Examples 1 to 3, the magnetic recording media in which the DLC film thickness of the second protective layer 6 was 0.3 nm or more but 2.0 nm or less and the first protective layer 5 is made of Si, Al, or Cu, have passed the evaluation tests on the saturation magnetization level and the corrosion resistance and durability obtained after being heated with a laser beam.

In addition, as shown in Comparative Example 1, the magnetic recording medium without the second protective layer did not provide sufficient corrosion resistance and durability after being heated with a laser beam.

Also as shown in Comparative Example 2, the magnetic recording medium having the first protective layer 5 made of Zr did not pass the evaluation tests on the corrosion resistance and durability after being heated with a laser beam. Reference Example 4, on the other hand, had good corrosion resistance and durability. In consideration of the results of Example 1 as well, the heat transmitted from the magnetic recording layer was not efficiently diffused in the plane due to the low thermal conductivity of Zr alone, but was transmitted to the second protective layer and lubricating layer immediately on the magnetic recording layer, which is considered to have resulted in deterioration of the film properties of the second protective layer and the lubricating layer.

Moreover, as shown in Comparative Example 3 in which the second protective layer 6 was thicker than 2.0 nm and the oxidation treatment was executed after the second protective layer 6 was formed, this magnetic recording medium, which was heated with a laser beam, failed the evaluation tests on its corrosion resistance and durability. Reference Examples 1 to 3, on the other hand, had good corrosion resistance and durability. In consideration of the results of Example 1 as well, the great thickness of the second protective layer 6 makes it difficult for the oxygen molecules to penetrate the second protective layer 6, making it difficult to form a $SiO_2$ film of low thermal conductivity as the first upper protective layer 5b. Therefore, it is considered that the film properties of the second protective layer 6 were deteriorated by the heat from the heated magnetic recording layer.

However, even when the second protective layer 6 is thicker than 2.0 nm as shown in Comparative Example 3, the magnetic recording medium of Example 4 in which the oxidation treatment was executed after the first protective layer 5 was formed passed the evaluation tests on its corrosion resistance and durability after being heated with a laser beam. This is considered because the first upper protective layer 5b was formed. It should be noted that favorable corrosion resistance and durability were obtained even when the first protective layer 6 was formed into 0.3 nm.

Also, as a result of using the $O_2$ gas for sputtering as shown in Comparative Example 4, a low saturation magnetization level was obtained and the magnetic film was deteriorated by the $O_2$ gas. Moreover, the corrosion resistance and durability of this magnetic recording medium heated with a laser beam failed the evaluation tests. The heat transmitted from the magnetic recording layer was not efficiently diffused in the plane, but was transmitted directly to the second protective layer and the lubricating layer formed immediately on the magnetic recording layer, which is considered to have resulted in deterioration of the film properties of the second protective layer and lubricating layer.

Furthermore, as a result of using Mg in the first protective layer 5 as shown in Comparative Example 5, the corrosion resistance and durability of this magnetic recording medium heated with a laser beam failed the evaluation tests. Reference Example 5, on the other hand, had good corrosion resistance and durability. In consideration of the results of Example 1 as well, the heat was transmitted from the magnetic recording layer to the second protective layer and lubricating layer immediately thereabove due to the high thermal conductivity of the oxide of the Mg (MgO), which is considered to have resulted in deterioration of the film properties of the second protective layer and the lubricating layer.

TABLE 2

| Sample number | First protective layer Material | First protective layer Gas used in film formation | First protective layer Thickness [nm] | Second protective layer (DLC) Thickness [nm] | Amount of oxygen O1s spectrum intensity | Saturation magnetization level Result | Saturation magnetization level Ms [emu/cm$^3$] | Heating with laser beam Heated/Not heated | Corrosion resistance Result | Corrosion resistance Co elution amount [ng/cm$^2$] | Durability Result | Durability Number of sliding motions [times] until wear | Total result |
|---|---|---|---|---|---|---|---|---|---|---|---|---|---|
| Example 1-1 | Si | Ar | 1.0 | 2.0 | 81,278 | ○ | 780 | Heated | ○ | 0.02 | ○ | 318 | ○ |
| Example 1-2 | | | | 1.5 | 83,990 | ○ | 787 | | ○ | 0.03 | ○ | 288 | ○ |
| Example 1-3 | | | | 1.0 | 84,587 | ○ | 783 | | ○ | 0.05 | ○ | 272 | ○ |
| Example 1-4 | | | | 0.5 | 89,012 | ○ | 777 | | ○ | 0.08 | ○ | 259 | ○ |
| Example 1-5 | | | | 0.3 | 95,104 | ○ | 776 | | ○ | 0.08 | ○ | 259 | ○ |
| Example 2-1 | Al | Ar | | 2.0 | 82,109 | ○ | 776 | | ○ | 0.03 | ○ | 332 | ○ |
| Example 2-2 | | | | 1.5 | 82,378 | ○ | 782 | | ○ | 0.04 | ○ | 298 | ○ |
| Example 2-3 | | | | 1.0 | 84,891 | ○ | 779 | | ○ | 0.06 | ○ | 280 | ○ |
| Example 2-4 | | | | 0.5 | 89,819 | ○ | 784 | | ○ | 0.10 | ○ | 263 | ○ |
| Example 3-1 | | | | 2.0 | 79,028 | ○ | 787 | | ○ | 0.03 | ○ | 305 | ○ |
| Example 3-2 | Cu | Ar | | 1.5 | 82,228 | ○ | 778 | | ○ | 0.05 | ○ | 290 | ○ |
| Example 3-3 | | | | 1.0 | 86,441 | ○ | 783 | | ○ | 0.06 | ○ | 277 | ○ |
| Example 3-4 | | | | 0.5 | 91,028 | ○ | 782 | | ○ | 0.09 | ○ | 248 | ○ |
| Example 4-1 | Si | Ar | | 2.0 | 80,023 | ○ | 783 | | ○ | 0.03 | ○ | 310 | ○ |
| Example 4-2 | | | | 3.0 | 80,023 | ○ | 785 | | ○ | 0.03 | ○ | 312 | ○ |
| Example 4-3 | | | | 4.0 | 85,201 | ○ | 780 | | ○ | 0.02 | ○ | 328 | ○ |
| Example 4-4 | | | | 5.0 | 86,333 | ○ | 781 | | ○ | 0.02 | ○ | 326 | ○ |

TABLE 3

| Sample number | First protective layer Material | First protective layer Gas used in film formation | First protective layer Thickness [nm] | Second protective layer (DLC) Thickness [nm] | Amount of oxygen O1s spectrum intensity | Saturation magnetization level Result | Saturation magnetization level Ms [emu/cm$^3$] | Heating with laser beam Heated/Not heated | Corrosion resistance Result | Corrosion resistance Co elution amount [ng/cm$^2$] | Durability Result | Durability Number of sliding motions [times] until wear | Total result |
|---|---|---|---|---|---|---|---|---|---|---|---|---|---|
| Comparative Example 1 | Si | Ar | 1.0 | 0.0 | 150,331 | X | 560 | Heated | X | 20.3 | X | 12 | X |
| Comparative Example 2-1 | Zr | Ar | | 2.0 | 78,100 | ○ | 785 | | X | 5.9 | X | 92 | X |
| Comparative Example 2-2 | | | | 1.5 | 82,641 | ○ | 787 | | X | 6.3 | X | 83 | X |
| Comparative Example 2-3 | | | | 1.0 | 87,389 | ○ | 779 | | X | 8.2 | X | 71 | X |
| Comparative Example 2-4 | | | | 0.5 | 90,124 | ○ | 782 | | X | 6.4 | X | 78 | X |
| Comparative Example 3-1 | Si | Ar | | 5.0 | 12,093 | ○ | 784 | | X | 2.8 | X | 130 | X |

TABLE 3-continued

| Sample number | First protective layer Material | First protective layer Gas used in film formation | First protective layer Thickness [nm] | Second protective layer (DLC) Thickness [nm] | Amount of oxygen O1s spectrum intensity | Saturation magnetization Result | Saturation magnetization Ms [emu/cm$^3$] | Heating with laser beam Heated/Not heated | Durability Corrosion resistance Result | Durability Co elution amount [ng/cm$^2$] | Durability Result | Number of sliding motions [times] until wear | Total result |
|---|---|---|---|---|---|---|---|---|---|---|---|---|---|
| Comparative Example 3-2 | | | | 4.0 | 15,392 | ○ | 780 | | X | 2.6 | X | 158 | X |
| Comparative Example 3-3 | | | | 3.0 | 24,660 | ○ | 779 | | X | 2.3 | X | 182 | X |
| Comparative Example 3-4 | | | | 2.5 | 46,157 | ○ | 788 | | X | 2.4 | X | 191 | X |
| Comparative Example 4 | Si | O$_2$ | | 2.0 | 132,974 | X | 420 | | | 3.7 | X | 18 | X |
| Comparative Example 5-1 | Mg | Ar | | 2.0 | 78,721 | ○ | 790 | | X | 2.8 | X | 122 | X |
| Comparative Example 5-2 | | | | 1.5 | 80,528 | ○ | 785 | | X | 4.2 | X | 120 | X |
| Comparative Example 5-3 | | | | 1.0 | 82,205 | ○ | 776 | | X | 3.0 | X | 105 | X |
| Comparative Example 5-4 | | | | 0.5 | 85,239 | ○ | 786 | | X | 3.5 | X | 101 | X |
| Reference Example 1 | Si | Ar | | 1.0 | — | — | — | Not heated | ○ | 0.05 | ○ | 280 | ○ |
| Reference Example 2 | | | | 3.0 | — | — | — | | ○ | 0.02 | ○ | 271 | ○ |
| Reference Example 3 | | | | 5.0 | — | — | — | | ○ | 0.01 | ○ | 266 | ○ |
| Reference Example 4 | Zr | Ar | | 1.0 | — | — | — | | ○ | 0.06 | ○ | 282 | ○ |
| Reference Example 5 | Mg | Ar | | 1.0 | — | — | — | | ○ | 0.04 | ○ | 301 | ○ |

EXPLANATION OF REFERENCE NUMERALS

1 Non-magnetic substrate
2 Soft magnetic underlayer
3 Underlayer
4 Magnetic recording layer
5 First protective layer
5a First lower protective layer
5b First upper protective layer
6 Second protective layer
7 Magnetic recording medium
101 Substrate polishing/cleaning step
102 Film forming step
103 Oxidation treatment (II)
104 Lubricating layer step
105 Surface cleaning step
106 Heating with laser beam

What is claimed is:

1. A magnetic recording medium for a heat-assisted recording system, comprising:
a magnetic recording layer on a non-magnetic substrate; and
a protective layer on top of the magnetic recording layer,
wherein the protective layer includes a first lower protective layer on top of the magnetic recording layer, a first upper protective layer on the first lower protective layer, and a second protective layer on the first upper protective layer,
the first lower protective layer is composed mainly of an element selected from the group consisting of Si, Al and Cu,
the first upper protective layer is a layer configured by an oxide of a material of the first lower protective layer, and
the second protective layer is formed of DLC (Diamond-Like Carbon) or glassy carbon.

2. The magnetic recording medium for a heat-assisted recording system according to claim 1, wherein the first lower protective layer has a thermal conductivity of 100 W/(m·k) or higher, and
the first upper protective layer has a conductivity of 50 W/(m·k) or lower.

3. A method for manufacturing a magnetic recording medium for a heat-assisted recording system that has a magnetic recording layer on a non-magnetic substrate and a protective layer on top of the magnetic recording layer, the method sequentially executing:
a step of forming a first protective layer on top of the magnetic recording layer;
a step of forming a second protective layer on top of the first protective layer; and
an oxidation treatment step,
wherein the second protective layer is formed of DLC or glassy carbon and has a film thickness of 0.3 nm or more and 2 nm or less, and
the first protective layer is composed mainly of an element selected from the group consisting of Si, Al and Cu.

4. A method for manufacturing a magnetic recording medium for a heat-assisted recording system that has a magnetic recording layer on a non-magnetic substrate and a protective layer on top of the magnetic recording layer, the method sequentially executing:

a step of forming a first protective layer on top of the magnetic recording layer;
an oxidation treatment step; and
a step of forming a second protective layer on top of the first protective layer,
wherein the second protective layer is formed of DLC or glassy carbon and has a film thickness of 0.3 nm or more and 5 nm or less, and
the first protective layer is composed mainly of an element selected from the group consisting of Si, Al and Cu.

* * * * *